(12) United States Patent
Lee et al.

(10) Patent No.: US 8,351,945 B2
(45) Date of Patent: Jan. 8, 2013

(54) PERFORMING ASSOCIATION DURING HANDOVER IN WIRELESS ACCESS SYSTEM

(75) Inventors: Chang-Jae Lee, Chungcheongnam-do (KR); Beom-Joon Kim, Seoul (KR); Ki-Seon Ryu, Seoul (KR); Yong-Ho Kim, Gyeonggi-do (KR); Yong-Won Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 886 days.

(21) Appl. No.: 11/194,721

(22) Filed: Aug. 1, 2005

(65) Prior Publication Data

US 2006/0030309 A1 Feb. 9, 2006

(30) Foreign Application Priority Data

Aug. 2, 2004 (KR) .......................... 10-2004-060969
Jan. 11, 2005 (KR) .......................... 10-2005-002418
Feb. 17, 2005 (KR) .......................... 10-2005-013315

(51) Int. Cl.
*H04W 36/00* (2009.01)
(52) U.S. Cl. ........ 455/438; 455/434; 455/436; 455/437; 455/439; 370/328
(58) Field of Classification Search ........... 455/434–453
See application file for complete search history.

(56) References Cited

U.S. PATENT DOCUMENTS

| 5,483,669 | A | * | 1/1996 | Barnett et al. ................. 455/437 |
| 5,640,414 | A | * | 6/1997 | Blakeney et al. .............. 375/130 |
| 5,722,073 | A | * | 2/1998 | Wallstedt et al. .............. 455/437 |
| 6,332,077 | B1 | | 12/2001 | Wu et al. |
| 7,215,956 | B2 | * | 5/2007 | Liu et al. ....................... 455/434 |
| 2002/0118656 | A1 | | 8/2002 | Agrawal et al. |
| 2005/0250499 | A1 | * | 11/2005 | Lee et al. ...................... 455/437 |
| 2006/0030309 | A1 | | 2/2006 | Lee et al. |

FOREIGN PATENT DOCUMENTS

| CN | 1386336 | 12/2002 |
| EP | 0963130 | 12/1999 |

(Continued)

OTHER PUBLICATIONS

Lee et al.—"Enhancement of association using SCAN—REQ/RSP, IEEE C802.16e-04/167r3", Jul. 12, 2004.*

(Continued)

*Primary Examiner* — Lester Kincaid
*Assistant Examiner* — Mehmood B Khan
(74) *Attorney, Agent, or Firm* — Lee, Hong, Degerman, Kang & Waimey

(57) ABSTRACT

A method of associating a mobile station to a base station in a wireless communication system comprises transmitting to a serving base station a scanning request message comprising an association indicator. The method also comprises receiving from the serving base station a scanning response message comprising a rendezvous time associated with a neighboring base station for initiating ranging with the neighboring base station, wherein the serving base station communicates an association notification to the neighboring base station, the association notification comprising the rendezvous time. The method also comprises associating with the neighboring base neighboring base station by transmitting a ranging request after passing of the rendezvous time determined from a transmission time of the scanning response message from the neighboring base station, wherein the rendezvous time is associated with a time the neighboring base station is expected to provide a non-contention based ranging opportunity for the mobile station.

13 Claims, 4 Drawing Sheets

FOREIGN PATENT DOCUMENTS

| | | |
|---|---|---|
| EP | 1347614 | 9/2003 |
| JP | 2002171558 | 6/2002 |
| KR | 1020050052124 | 6/2005 |

OTHER PUBLICATIONS

Barber—"Revision of Hand-over Mechanism for Mobility Enhancement", Jan. 2, 2004.*

Lee, S. et al. "Enhancement of Scanning and Association using SCAN-REQ/RSP", IEEE 802.16 Broadband Wireless Access Working Group, IEEE C802.16e-04/167r3, [online], Jul. 12, 2004 [retrieved on Dec. 22, 2006]. Retrieved from Internet: URL:htttp://wwww.ieee802.org/16/tge/contrib/C80216e-04_167r3.pdf.> Sections 1-3, fig. E.2.

Lee, S. et at. "Enhancement of Association using SCAN-REQ/RSP", IEEE 802.16 Broadband Wireless Access Working Group, IEEE C802.16e-04157r1, [online], May 17, 2004 [retrieved on Dec. 22, 2006]. Retrieved from the Internet: URL:http://www.ieee802.org/16/tge/contrib/C80216e-04_57r1.pdf. Sections 1-3, fig. E.2.

Sungjin Lee et al., "Enhancement of Scanning and Association using SCAN-REQ/RSP", IEEE C802.16E-04/167R1, XX, XX, Jun. 25, 2004, Samsung Electronics.

\* cited by examiner

*CINR : Carrier Interference Noise Ratio

PERFORMING ASSOCIATION DURING HANDOVER IN WIRELESS ACCESS SYSTEM

CROSS-REFERENCE TO RELATED APPLICATIONS

Pursuant to 35 U.S.C. §119(a), this application claims the benefit of earlier filing date and right of priority to Korean Application No. 10-2004-0060969, filed on Aug. 2, 2004, Korean Application No. 10-2005-0002418, filed on Jan. 11, 2005, and Korean Application No. 10-2005-0013315, filed on Feb. 17, 2005, the contents of which are hereby incorporated by reference herein in their entirety.

FIELD OF THE INVENTION

The present invention relates generally to a wireless access system and, more particularly, to performing handover in a wireless access system.

BACKGROUND OF THE INVENTION

In order to register with a network or to be re-registered with a new base station for a handover in a wireless access system, a mobile station (MS) must perform uplink synchronization with the base station (BS) and receive a management access ID. This process is referred to as initial ranging. In addition, the mobile station measures signal quality by receiving signals from neighboring base stations in order to search for an optimum base station for handover. This second process is referred to as scanning.

After scanning, the mobile station requests a handover to a serving base station when a base station appears that has a signal quality above a certain level. When receiving a handover response signal from the serving base station, the mobile station performs initial ranging with a handover target base station so as to be re-registered with the handover target base station.

The mobile station re-uses a ranging parameter during actual handover by measuring signal quality of neighboring base stations and pre-performing initial ranging in a scanning process in order to reduce a handover time before the handover is actually performed. This method is referred to as an association or a pre-handover.

FIG. 1 is a diagram illustrating an association procedure in accordance with a related art.

Referring to FIG. 1, a serving base station (e.g., BS1) periodically includes channel information associated with neighboring base stations (e.g., BS2 and BS3) in a MAC management message (e.g., MOB-NBR-ADV) and sends the MOB-NBR-ADV to a mobile station (MS). At this time, the MOB-NBR-ADV is sent to the MS as a broadcast.

Upon receiving the MOB-NBR-ADV, the MS sends a scanning request message (e.g., MOB-SCN-REQ) including scanning duration information to the serving base station (e.g., BS1). The BS 1 includes information related to a scanning rendezvous time and the scanning duration in a scanning response message (e.g., MOB-SCN-RSP) and sends the MOB-SCN-RSP to the MS.

Upon reaching the scanning rendezvous time, the MS performs the scanning by performing downlink synchronization with neighboring base stations and measuring signal quality. During the scanning duration, the MS performs an association by performing initial ranging with each base station. Much time may be required to perform the initial ranging because radio resources for the initial ranging are allocated based on contention.

Upon expiration of the scanning duration, the MS disconnects from the neighboring base stations and performs uplink and downlink synchronizations with the serving base station BS1, thereby allowing transmission and reception of data to and from the serving base station.

However, the association procedure of the related art has several problems. First, since the association is performed during the scanning process, there is no standard for which of the base stations is the one with which the mobile station is to associate. Thus, the mobile station performs associations with all neighboring base stations, thereby taking much time for handover. Second, it may take longer to perform the related art association and there is difficulty in setting the scanning duration at a scanning request because contention based initial ranging is performed. Furthermore, if the scanning duration is short, the association may not be performed within the scanning duration. If the scanning duration is excessively long, downlink traffic which should be transmitted to the mobile station for the scanning duration stays in the base station. Furthermore, waste of radio resources may result from these problems.

SUMMARY OF THE INVENTION

Accordingly, the present invention is directed to performing association during handover in a wireless access system that substantially obviates one or more problems of the related art.

An object of the present invention is to perform association to reduce handover time by defining a MAC management message in a backbone message.

Another object of the present invention is to provide an association method to allow a mobile station to perform ranging in accordance with resource allocation time of an associated target base station by compensating delay time occurring when backbone messages are sent in an association procedure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of associating a mobile station to a base station in a wireless communication system comprises transmitting to a serving base station a scanning request message comprising an association indicator. The method also comprises receiving from the serving base station a scanning response message comprising a rendezvous time associated with a neighboring base station for initiating ranging with the neighboring base station, wherein the serving base station communicates an association notification to the neighboring base station, the association notification comprising the rendezvous time. The method also comprises associating with the neighboring base station by transmitting a ranging request after passing of the rendezvous time determined from a transmission time of the scanning response message from the neighboring base station, wherein the rendezvous time is associated with a time the neighboring base station is expected to provide a non-contention based ranging opportunity for the mobile station.

Association notifications may be transmitted to a plurality of neighboring base stations, each respective association notification comprises rendezvous time associated with each one of the plurality of neighboring base stations. The mobile station may associate with each one of the plurality of neighboring base stations at each rendezvous time.

The method may further comprise receiving a ranging response comprising ranging parameters from the neighboring base station, wherein the mobile station stores the ranging parameters for a predetermined time. The method may further comprise receiving a ranging response comprising ranging parameters and a service level prediction from the neighboring base station, wherein the mobile station stores the ranging parameters for a predetermined time based on the service level prediction.

The non-contention based ranging may be associated with allocation of an uplink transmission slot. The rendezvous time may represent a plurality of frame sizes being supported by neighboring base stations. The scanning response message may further comprise at least one neighboring base station identifier for indicating recommended base stations for associating. The association indicator may comprise a media access control (MAC) address of the mobile station.

In another embodiment, a method of associating a mobile station to a base station in a wireless communication system comprises receiving a scanning request message comprising an association indicator from a mobile station at a serving base station. The method also comprises transmitting the association indicator from the serving base station to at least one neighboring base station to set a rendezvous time. The method also comprises transmitting a scanning response message from the serving base station to the mobile station, the scanning response message comprising the rendezvous time associated with the at least one neighboring base station for initiating ranging of the mobile station with the at least one neighboring base station.

The method may further comprise receiving an association confirmation confirming the rendezvous time from the at least one neighboring base station in response to the association indicator. Associating of the mobile station to one of the at least one neighboring base station may be associated with allocation of an uplink transmission slot. The rendezvous time may represent a plurality of frame sizes being supported by the at least one neighboring base station. The scanning response message may further comprise at least one neighboring base station identifier for indicating recommended base stations for associating.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A base station (BS) may be considered a neighboring base station based on a measured signal quality. Information for association may include an association rendezvous frame, an association duration and information indicating whether an association request is accepted or not. An association request may include notifying a base station of an association request in the serving base station and receiving association related information from the base station. The base station may determine whether or not to accept the association request based on a QoS (quality of service) level requested by a mobile station (MS) or a QoS level which may be provided to the mobile station. The results of the determination may be included in a backbone message and transmitted to the serving base station. When the base station determines to accept the association request, the backbone message may include information related to the association rendezvous frame. When the association rendezvous frame is reached, the base station may allocate uplink radio resources to the mobile station such that the mobile station may transmit a ranging request for the association to the base station. The base station may cancel the allocated uplink radio resources if the ranging request from the mobile station is not received for a predetermined time after allocating the uplink radio resources.

In one embodiment, a mobile station performs associations only with neighboring base stations having a signal quality above a certain level where the mobile station is allowed to perform non-contention based initial ranging.

When a serving base station notifies an association target base station through a backbone message that a mobile station is to perform an association, the association target base station allocates uplink radio resources (e.g., uplink ranging slots) for the mobile station in advance. The mobile station may then perform non-contention based initial ranging.

Figure 1:
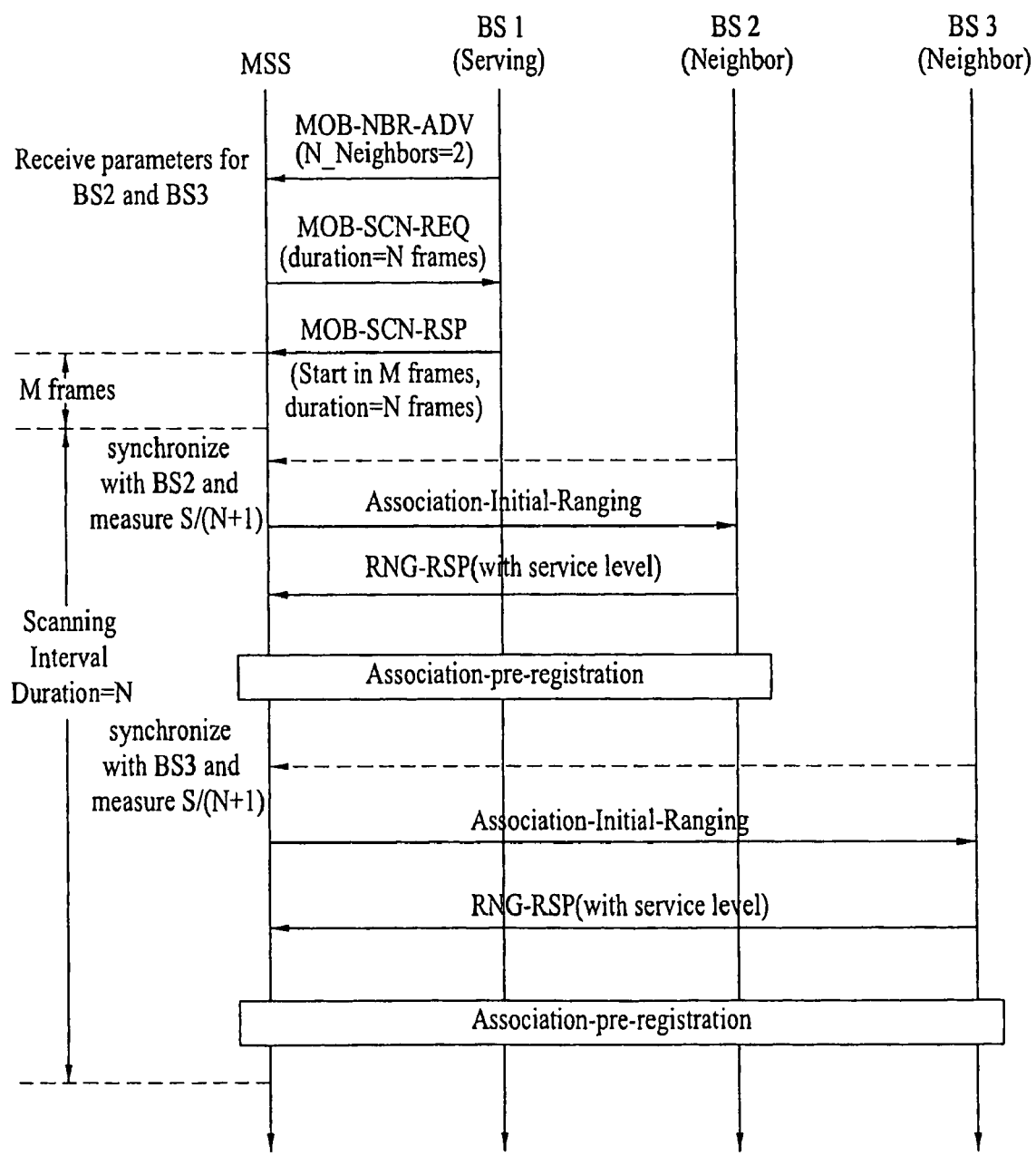
FIG. 1 is a diagram illustrating an association procedure in accordance with a related art.
Figure 2:
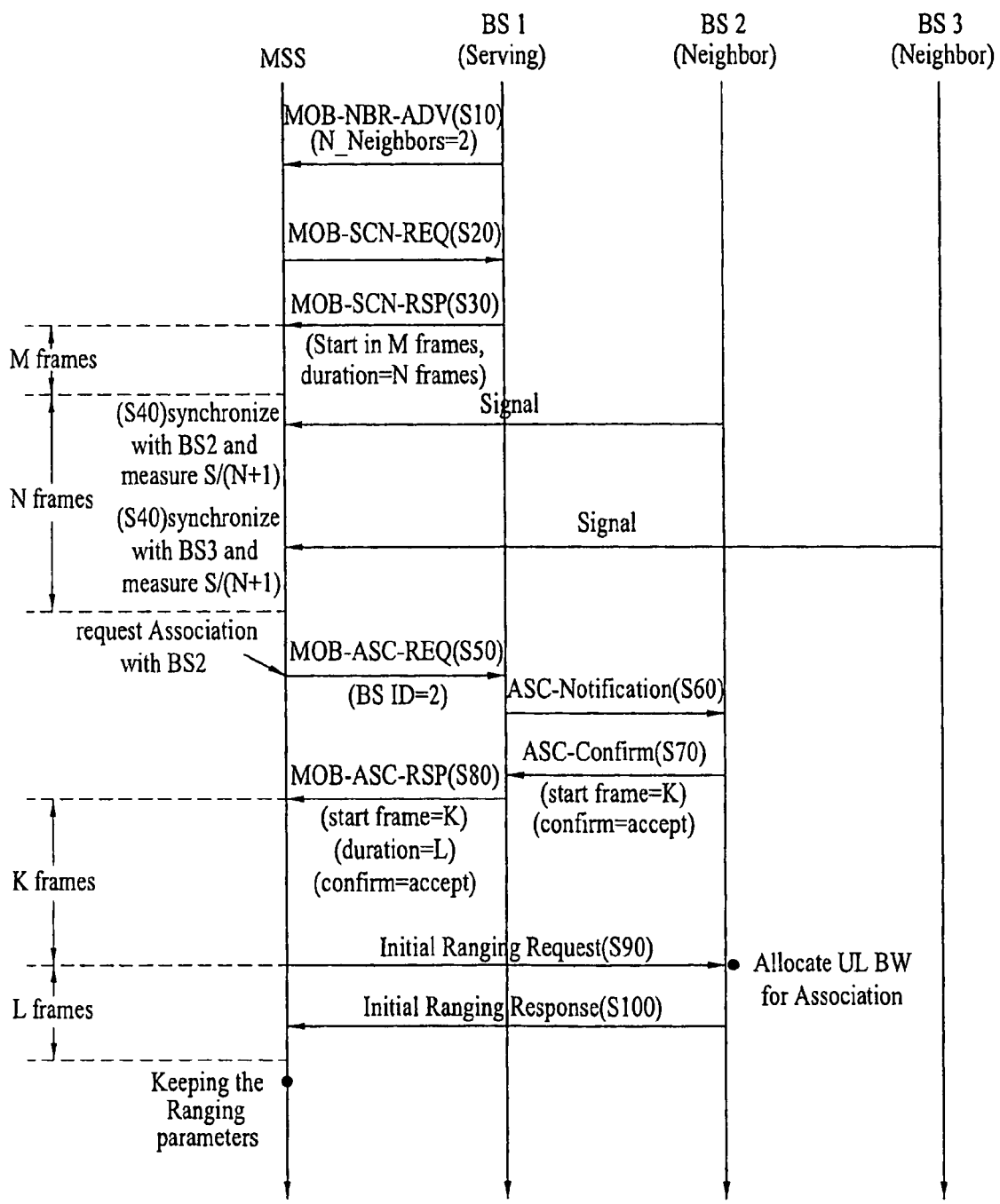
FIG. 2 is a diagram illustrating an association procedure, according to an embodiment of the present invention.

FIG. 2 is a diagram illustrating an association procedure, according to an embodiment of the present invention.

Referring to FIG. 2, a serving base station (e.g., BS1) includes channel information of neighboring stations (e.g., BS2 and BS3) in a MAC management message (e.g., MOB-NBR-ADV) and periodically sends the MOB-NBR-ADV to a mobile station (S10). At this time, the MOB-NBR-ADV is sent by a broadcast.

In addition, if the MOB-NBR-ADV is received, the MS sends a scanning request message (e.g., MOB-SCN-REQ) to the serving base station (e.g., BS1) and requests scanning. The serving base station (e.g., BS1) may send a scanning response message (e.g., MOB-SCN-RSP) to the MS to permit the scanning (S20 and S30).

Upon a start of the scanning, the MS receives signals from the neighboring base stations (e.g., BS2 and BS3) during the scanning duration (e.g., N frames) and measures signal quality of each of the neighboring base stations (S40). During the scanning duration (e.g., N frames), the association is not performed.

Upon completion of the scanning, based on a scanning result, the MS may determine which neighboring base stations may provide signal quality above a certain level. The MS may send an association request MAC management message (e.g., MOB-ASC-REQ) to the serving base station (e.g., BS1) in order to request associations with the neighboring base stations (S50). The MS decides on a base station based on the present state of resource use of neighboring base stations.

The serving base station receives the MOB-ASC-REQ, and may include QoS level information requested by the MS in a backbone message (e.g., ASC-Notification) and send the backbone message (e.g., ASC-Notification) to the neighboring base station (S60).

The neighboring base station receives the association request from the MS through the backbone message, determines whether or not to accept the association on the basis of the QoS level information, includes the determined association acceptance information and association rendezvous frame information in the backbone message (e.g., ASC-Confirm) and sends the ASC-Confirm to the serving base station (S70). The association rendezvous frame is a time at which an uplink slot is allocated to the mobile station such that the mobile station may send an uplink ranging request message for association.

The serving base station receives the backbone message (e.g., ASC-Confirm) and may include the association rendezvous frame, the association duration (e.g., duration for which the serving base station buffers downlink data) information, and information on whether or not to accept the association included in the backbone message (e.g., ASC-Confirm), in an association response message (e.g., MOB-ASC-RSP). The serving base station may then send the MOB-ASC-RSP to the MS (S80).

Upon a start of the association rendezvous frame, the MS sends an initial ranging request message to the neighboring base station through the allocated uplink slot (S90). When receiving an initial ranging response message about the initial ranging request message (S100), the MS obtains a ranging parameter (e.g., uplink synchronization acquisition and management access ID allocation). The neighboring base station allocates the uplink slot to the MS for a predetermined period of time and cancels the allocated slot if it is unable to receive the initial ranging request from the MS for the predetermined period of time in order to prevent waste of resources.

The MS holds the ranging parameter obtained by the association for a predetermined period of time (e.g., using an association aging timer). When performing a handover to the neighboring base station within the predetermined period of time (e.g., before the association aging timer expires), time for handover is reduced by performing network registration by using the held ranging parameter.

Figure 3:
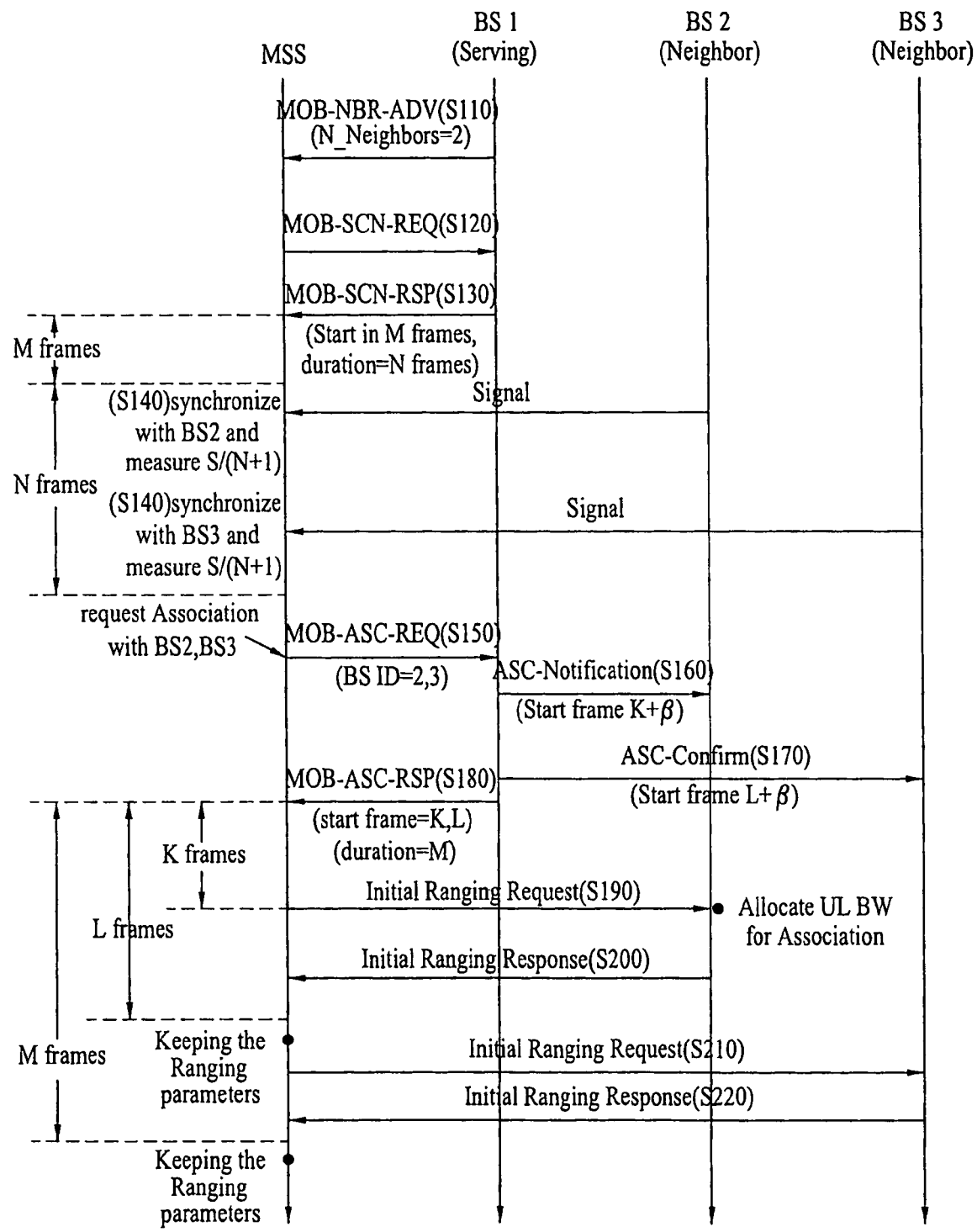
FIG. 3 is a diagram illustrating an association procedure, according to another embodiment of the present invention.

FIG. 3 is a diagram illustrating an association procedure, according to another embodiment of the present invention.

Referring to FIG. 3, a method is illustrated for performing associations with neighboring base stations when it is determined by scanning that at least two neighboring base stations provide signal quality which is above a certain level.

Scanning procedures (S110~S140) used with reference to FIG. 3 may be the same as those described with reference to FIG. 2. Referring to FIG. 2, the mobile station sends an association request MAC management message (e.g., MOB-ASC-REQ) to the serving base station (e.g., BS1) so that the MS may request associations with the two neighboring stations (e.g., BS2 and BS3) (S150).

The serving base station receives the MOB-ASC-REQ and includes association rendezvous frame information and association duration information necessary for association with the MS in respective backbone messages (e.g., ASC-Notification). The serving base station then sends the ASC-Notification to the neighboring base stations (S160 and S170). Referring again to FIG. 3, for the BS2, the rendezvous frame at which the association is performed with the MS is set as 'K+α', and for the BS3, it is set as 'L+β'.

Furthermore, the serving base station may include information regarding association rendezvous frame and association duration pertaining to each of the neighboring base stations in an association response message (e.g., MOB-ASC-RSP) (S180). In FIG. 3, the association rendezvous frame with the BS2 is set as 'K', the association rendezvous frame with BS3 is set as 'L', and the association duration is set as 'M'. The association time frame allocated to each of the neighboring base stations and the association time frame allocated to the MS may differ by as much as α, β. This is because there is a time difference between when the serving base station sends the message to allocate the association rendezvous frame to each of the neighboring base stations and when the serving base station sends the message of allocating the association rendezvous frame to the MS. Accordingly, if the time when these two messages is sent is the same, α, β may be 0.

Thereafter, when it is time for the association rendezvous frames with the BS1 and BS2, the MS receives uplink slots from the neighboring base stations, and sends initial ranging request messages though the allocated uplink slots (S190 and S210). When receiving initial ranging response messages with respect to the initial ranging requests (S200 and S220), the MS obtains ranging parameters (e.g., uplink synchronization acquisition and management access ID allocation). At this time, the neighboring base station may notify the MS of an association aging time parameter value indicating how long the ranging parameter acquired by the MS through the association with the neighboring base station is effective. The ranging parameter may be included in the ranging response message. In addition, the MS may use a previously defined value without receiving the association aging time value from the base station. The neighboring base station allocates the uplink slot for a predetermined period of time to the MS and cancels the allocated slot when it is unable to receive the initial ranging request from the MS for the predetermined period of time in order to prevent waste of resources.

The MS holds the ranging parameters obtained by the associations for a predetermined period of time (e.g., using an association aging timer), and may reduce handover time by performing network registration using the held ranging parameters when performing a handover to the neighboring base station within the predetermined period of time (e.g., before the expiration of the association aging timer).

Figure 4:
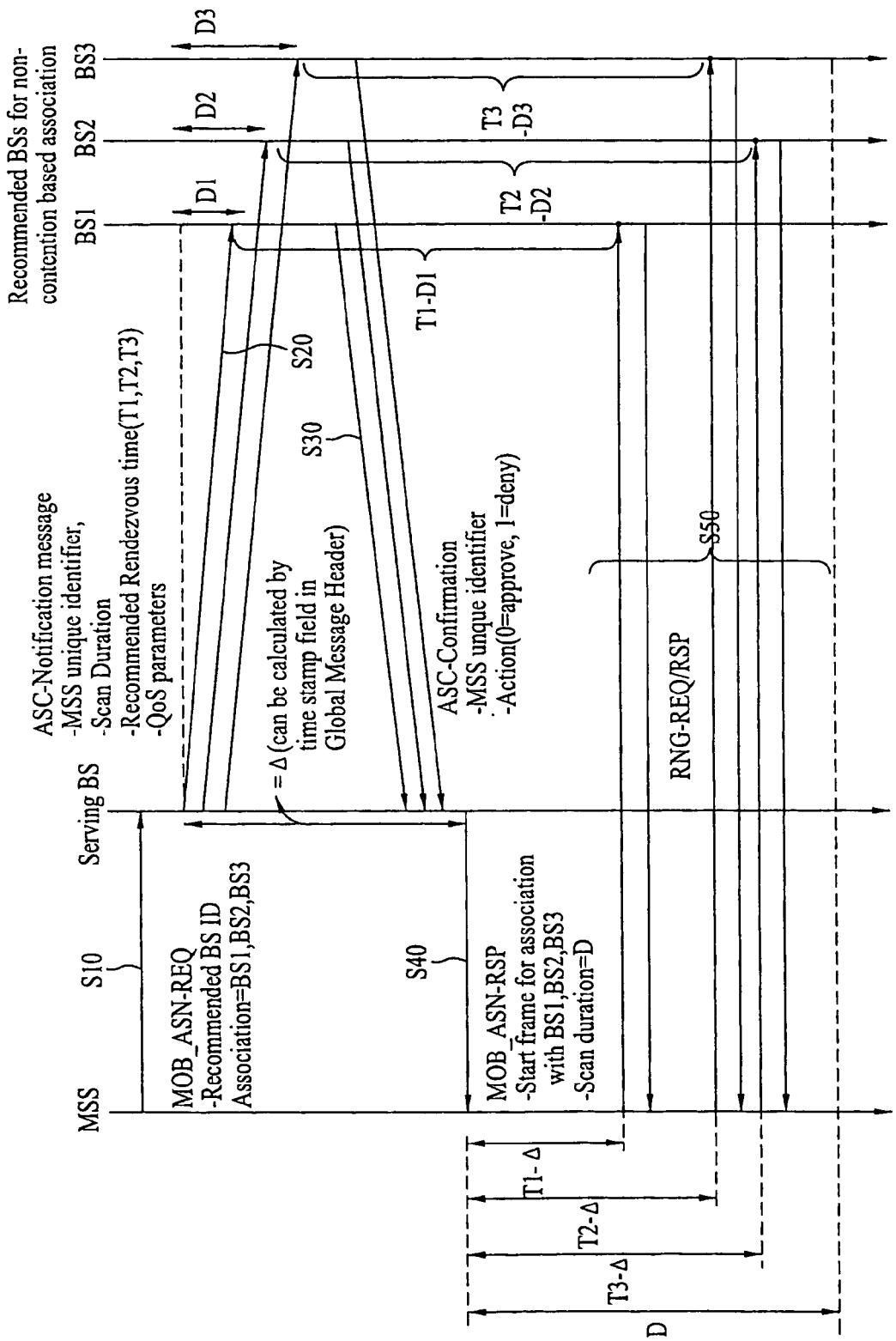
FIG. 4 is a flow diagram illustrating a method for association, according to an embodiment of the present invention.

FIG. 4 is a flow diagram illustrating a method for association, according to an embodiment of the present invention.

Referring to FIG. 4, an association procedure with neighboring base stations is described when the mobile station performs non-contention based association through allocation of resources with three neighboring base stations (e.g., BS1, BS2 and BS3).

The serving base station receives an association request message (e.g., MOB-ASC-REQ) including identifiers of the association target base stations from the mobile station (S10), and sends each of the base stations a backbone message including an identifier of the MS, an association duration, a recommended rendezvous time, and a QoS information of the MS (S20).

Upon receiving the backbone messages, the base stations may permit the QoS information requested by the MS, and the association duration and recommended rendezvous time set by the serving base station. The serving base station may be notified of the permission by the base stations by the setting of an action code of the backbone message (e.g., ASC-Confirmation) to 0, for example, and the transmitting of the backbone message to the serving base station (S30). If the association request is not permitted, the neighboring base station may notify the serving base station by transmitting the backbone message (e.g., ASC-Confirmation) with an action code set to 1, for example.

When a delay occurs in a process of exchanging the backbone messages (S20 and S30), a time difference between a time that the neighboring base stations allocate resources for associations and a time that the MS actually tries associations may result. Such a time difference may reduce efficiency of the association procedure.

Therefore, to solve this problem, each of the base stations uses a time stamp field included in a header of the backbone message. The time stamp field included in the header of a backbone message indicates a time when the message is sent. Thus, to synchronize all the base stations with each other, all the base stations should have time stamps with the same value at the same time.

In a case where the serving base station sends the BS1, one of the neighboring base stations, the backbone message indicating that the MS is to perform association after a time T1, the BS1 may measure a delay generated when the backbone message was sent with the time stamp field in the backbone message. A value 'D1' may be obtained by calculating the delay in terms of frame units. The BS1 may allocate resources for association after a T1-D1 frame.

The serving base station receives the backbone messages (e.g., ASC-Confirmation) from all the neighboring base stations and sends an association response message (e.g., MOB-ASC-RSP) including an identifier of the neighboring base station and the association duration to the neighboring base station which permits the association (S40).

To determine the association duration, the serving base station may measure the total length of delays occurring when the serving base station exchanges the backbone messages with the neighboring base stations. A value 'A' may be obtained by calculating the total length in terms of frame units and a time at which the BS1 and the MS perform the association is T1-Δ.

The MS may then perform a ranging procedure for association after the frame to each association duration with respect to the neighboring base stations included in the MOB-ASC-RSP (S50). The neighboring base stations may maintain allocations of the resources only for a predetermined period of time when the MS does not try ranging for association through the allocated resources. The predetermined period of time may not exceed a value related to the association duration included in the backbone message (e.g., ASC-Notification) sent from the serving base station.

A delay compensating method based on a time stamp value may be applied when calculating the association duration. Table 1, below, shows one example of the MAC management message (e.g., MOB-ASC-REQ) in which the MS requests the association from the base station.

TABLE 1

| Syntax | Size (bit) | Notes |
|---|---|---|
| MOB-ASC-REQ_Message_Format(){ | | |
| Management Message Type = TBD | 8 | |
| Association duration | 8 | Association duration |
| N_Neighbor_BS | 8 | The number of neighboring base stations |
| for(i = 0; i < N_Neighbor_BS; i++){ | | |
| Neighbor BS ID | 48 | Base station ID |
| } | | |
| HMAC Tuple | 21 | The HMAC Tuple Attribute contains a keyed Message digest (to authenticate the sender). |
| } | | |

Table 2, below, shows one example of the association response message (e.g., MOB-ASC-RSP) which the base station sends to the mobile station.

TABLE 2

| Syntax | Size (bit) | Notes |
|---|---|---|
| MOB-ASC-RSP_Message_Format(){ | | |
| Management Message Type = TBD | 8 | |
| Association duration | 8 | Association duration |
| N_Neighbor_BS | 8 | The umber of neighboring base stations |
| for(i = 0; i < N_Neighbor_BS; i++){ | | |
| Neighbor BS ID | 48 | Base Station ID |
| Rendezvous frame | 8 | The rendezvous frame indicates after how many frames the mobile station performs an association with the base station |
| Confirm | 1 | The Confirm indicates whether or not the mobile station is associated with the base station |
| Reserved | 7 | |
| } | | |
| HMAC Tuple | 21 | The HMAC Tuple Attribute contains a keyed Message digest (to authenticate the sender). |

The MS requests an association with at least one neighboring base station from the serving base station through the association request message (e.g., MOB-ASC-REQ) as shown in Table 1 and receives information regarding whether the mobile station may perform the association with at least one neighboring base station through the association response message as shown in Table 2.

Table 3, below, shows one example of the backbone message (e.g., ASC-Notification) by which the serving base station having received the MOB-ASC-REQ notifies the neighboring base station of the association of the MS.

TABLE 5

| Field | Size (bit) | Notes |
|---|---|---|
| Message Type | 8 | |
| Sender BS ID | 48 | Base station unique identifier (Same number as that broadcasted on the DL-MAP message) |
| Target BS ID | 48 | Base station unique identifier (Same number as that broadcasted on the DL-MAP message) |
| Time Stamp | 32 | Number of miliisecond since midnight GMT (set to 0xffffffff to ignore) |
| Num Records | 16 | Number of MS identify records |

TABLE 3

| Field | Size (bit) | Notes |
|---|---|---|
| Global Message Header | 152 | Refer to 14.5.10.nn Global Message Header |
| For (i = 0; j < Num_Records; j++) { | | |
| MS unique identifier | 48 | 48-bit unique identifier of MS requesting non contention based association by transmitting MOB_SCN-REQ message. |
| Association duration | 8 | Duration (in unit of frames) of the requested association period. |
| Recommended Rendezvous Time | 16 | Resources allocation time for association requested by the serving base station from the neighboring base station. This time is in unit of frames and means after how many frames the association is performed. |
| Num_SFID_Records | 8 | |
| For(i = 1; i < Num_SFID_Records; i++){ | | |
| SFID | 32 | |
| Num_QoS_Records | 8 | |
| For(i = 1; < Num_QoS_Records; i++){ | | |
| TLV encoded information | Variable | |
| } | | |
| } | | |
| } | | |
| Security field | TBD | A means to authenticate this message |

Table 4, below, shows one example of the backbone message (e.g., ASC-Confirm) sent by a neighboring base station that received the association notification message in order to notify the serving base station whether or not the neighboring base station permits the association.

TABLE 4

| Field | Size (bit) | Notes |
|---|---|---|
| Global Message Header | 152 | |
| For (j = 0; j < Num_Records; j++) { | | |
| MS unique identifier | 48 | 48-bit unique identifier of MS requesting non-contention based association by transmitting MOB_SCN-REQ message. |
| Action Code | 1 | 0: approve the non-contention based association request at the recommended Rendezvous time during Scan duration. 1: deny the non-contention based association. |
| Reserved | 7 | |
| } | | |
| Security field | TBD | A means to authenticate this message |

Table 5, below, shows one example of a header of the common message which may be applied to the backbone messages shown in Table 3 and Table 4.

The neighboring base station may allocate uplink radio resources so that the MS may transmit an uplink ranging request through a non-contention uplink slot.

In one embodiment of the present invention, a method of associating a mobile station to a base station in a wireless communication system comprises transmitting to a serving base station a scanning request message comprising an association indicator. The method also comprises receiving from the serving base station a scanning response message comprising a rendezvous time associated with a neighboring base station for initiating ranging with the neighboring base station, wherein the serving base station communicates an association notification to the neighboring base station, the association notification comprising the rendezvous time. The method also comprises associating with the neighboring base station by transmitting a ranging request after passing of the rendezvous time determined from a transmission time of the scanning response message from the neighboring base station, wherein the rendezvous time is associated with a time the neighboring base station is expected to provide a non-contention based ranging opportunity for the mobile station.

Association notifications may be transmitted to a plurality of neighboring base stations, each respective association notification comprises rendezvous time associated with each one of the plurality of neighboring base stations. The mobile station may associate with each one of the plurality of neighboring base stations at each rendezvous time.

The method may further comprise receiving a ranging response comprising ranging parameters from the neighboring base station, wherein the mobile station stores the ranging parameters for a predetermined time. The method may further comprise receiving a ranging response comprising ranging parameters and a service level prediction from the neighboring base station, wherein the mobile station stores the ranging parameters for a predetermined time based on the service level prediction.

The non-contention based ranging may be associated with allocation of an uplink transmission slot. The rendezvous time may represent a plurality of frame sizes being supported by neighboring base stations. The scanning response message may further comprise at least one neighboring base station identifier for indicating recommended base stations for associating. The association indicator may comprise a media access control (MAC) address of the mobile station.

In another embodiment, a method of associating a mobile station to a base station in a wireless communication system comprises receiving a scanning request message comprising an association indicator from a mobile station at a serving base station. The method also comprises transmitting the association indicator from the serving base station to at least one neighboring base station to set a rendezvous time. The method also comprises transmitting a scanning response message from the serving base station to the mobile station, the scanning response message comprising the rendezvous time associated with the at least one neighboring base station for initiating ranging of the mobile station with the at least one neighboring base station.

The method may further comprise receiving an association confirmation confirming the rendezvous time from the at least one neighboring base station in response to the association indicator. Associating of the mobile station to one of the at least one neighboring base station may be associated with allocation of an uplink transmission slot. The rendezvous time may represent a plurality of frame sizes being supported by the at least one neighboring base station. The scanning response message may further comprise at least one neighboring base station identifier for indicating recommended base stations for associating.

As described above, the present invention prevents unnecessary association from being performed by performing associations only with base stations providing a signal quality above a certain level. The present invention may prevent waste of radio resources by notifying a serving base station that an association is unnecessary when a base station is unable to provide the mobile station with QoS and by not allocating uplink radio resources.

Additionally, the present invention may reduce time requested for association and allow efficient use of uplink radio resources by allocating an uplink slot capable of performing initial ranging to the mobile station performing an association procedure, and notifying the mobile station accordingly.

Furthermore, the present invention may improve performance of association through allocated resources by appropriately compensating a delay occurring when a message is sent between the serving base station and the neighboring base station when the mobile station performing the association procedure performs initial ranging.

In addition, the neighboring base stations may set the maximum value of resources allocation duration for the association of the mobile station as a termination point in time of permitted association duration. This is because the serving base station notifies the neighboring base station of the association duration which is permitted by the mobile station. This may prevent waste caused by unnecessary reservation of resources after the association duration.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of associating a mobile station with a base station in a wireless communication system, the method comprising:

transmitting, to a serving base station, a scanning request message comprising an association indicator;

receiving, from the serving base station, a scanning response message comprising a scan start frame and a scan duration;

scanning a neighboring base station by comparing a signal quality of the neighboring base station with a threshold to select the neighboring base station for performing a ranging procedure;

transmitting, to the serving base station, an association request message for requesting association with the selected neighboring base station for performing the ranging procedure;

receiving, from the serving base station, an association response message comprising a rendezvous time associated with the selected neighboring base station for initiating the ranging procedure, wherein the serving base station transmits an association notification to the selected neighboring base station to set the rendezvous time;

associating with the selected neighboring base station by transmitting a ranging request after the rendezvous time has passed, wherein the rendezvous time is associated with a time that the selected neighboring base station is expected to provide a non-contention based ranging opportunity for the mobile station;

receiving a ranging response from the selected neighboring base station comprising ranging parameters, an association aging timer parameter, and a service level prediction, wherein the association aging timer parameter indicates how long the ranging parameters are effective; and storing the ranging parameters for a predetermined time according to the association aging timer parameter and the service level prediction, wherein the association request message includes a number indicating a number of neighboring base stations.

2. The method of claim 1, wherein the association notification includes the rendezvous time associated with the selected neighboring base station and is transmitted to the selected neighboring base station.

3. The method of claim 2, wherein the mobile station associates with the selected neighboring base station at each rendezvous time.

4. The method of claim 1, wherein the non-contention based ranging is associated with allocation of an uplink transmission slot.

5. The method of claim 1, wherein the rendezvous time represents a plurality of frame sizes being supported by the selected neighboring base station.

6. The method of claim 1, wherein the scanning response message comprises a neighboring base station identifier for indicating recommended neighboring base stations for associating with.

7. The method of claim 1, wherein the association indicator comprises a media access control (MAC) address of the mobile station.

8. A mobile station, configured to associate to a base station in a wireless communication system, the mobile station comprising:

a scanner configured to scan a neighboring base station by comparing a signal quality of the neighboring base station with a threshold to select the neighboring base station for performing a ranging procedure;

a transmitter configured to:
transmit, to a serving base station, a scanning request message comprising an association indicator; and
transmit, to the serving base station, an association request message for requesting association with the selected neighboring base station;

a receiver configured to:
receive, from the serving base station, a scanning response message comprising a scan start frame and a scan duration;
receive, from the serving base station, an association response message comprising a rendezvous time associated with the selected neighboring base station for initiating the ranging procedure; and
receive, from the selected neighboring base station, a ranging response comprising ranging parameters, an association aging timer parameter, and a service level prediction, wherein the association aging timer parameter indicates how long the ranging parameters are effective, wherein the serving base station transmits an association notification to the selected neighboring base station to set the rendezvous time;

a controller configured to associate the mobile station with the selected neighboring base station by controlling the transmitter to transmit a ranging request after the rendezvous time has passed, wherein the rendezvous time is associated with a time when the neighboring base station is expected to provide a non-contention based ranging opportunity for the mobile station, wherein the mobile station stores the ranging parameters for a predetermined time according to the service level prediction, and wherein the association request message includes a number indicating a number of neighboring base stations.

9. The mobile station of claim 8, wherein the association notification is transmitted to the selected neighboring base station, and wherein the association notification comprises the rendezvous time associated with the selected neighboring base station.

10. The mobile station of claim 9, wherein the mobile station associates with the selected neighboring base station at the rendezvous time.

11. The mobile station of claim 8, wherein the non-contention based ranging is associated with allocation of an uplink transmission slot.

12. The mobile station of claim 8, wherein the rendezvous time represents a plurality of frame sizes being supported by the selected neighboring base station.

13. The mobile station of claim 8, wherein the scanning response message comprises a neighboring base station identifier for indicating a recommended neighboring base station for associating with.

* * * * *